United States Patent
Grohmann

(10) Patent No.: US 9,961,492 B2
(45) Date of Patent: May 1, 2018

(54) METHOD FOR MONITORING AN OPERATION LOCATION OF A SURFACE PROCESSING APPARATUS, AND MONITORING SYSTEM

(71) Applicant: Alfred Kärcher GmbH & Co. KG, Winnenden (DE)

(72) Inventor: Alexander Grohmann, Urbach (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days. days.

(21) Appl. No.: 15/170,481

(22) Filed: Jun. 1, 2016

(65) Prior Publication Data
US 2016/0277887 A1  Sep. 22, 2016

Related U.S. Application Data

(63) Continuation of application No. PCT/EP2013/075280, filed on Dec. 2, 2013.

(51) Int. Cl.
*G08B 1/08* (2006.01)
*H04W 4/02* (2018.01)
*A47L 11/40* (2006.01)
*G08C 25/04* (2006.01)
*H04L 29/08* (2006.01)

(52) U.S. Cl.
CPC ......... *H04W 4/021* (2013.01); *A47L 11/4008* (2013.01); *A47L 11/4011* (2013.01); *G08C 25/04* (2013.01); *A47L 2201/00* (2013.01); *G08C 2201/91* (2013.01); *H04L 67/125* (2013.01)

(58) Field of Classification Search
CPC ... H04W 4/021; G08C 25/04; G08C 2201/91; A47L 11/4008; A47L 11/4011; A47L 2201/00; H04L 67/125
USPC ............ 340/539.32, 539.11, 539.14, 539.15, 340/686.1
See application file for complete search history.

(56) References Cited

U.S. PATENT DOCUMENTS 6,459,955 B1 * 10/2002 Bartsch ...................... A47L 9/00
318/568.11
7,218,993 B2 * 5/2007 Yasukawa ................ B25J 5/007
318/568.12

(Continued)

FOREIGN PATENT DOCUMENTS

JP   2000-304556   11/2000

*Primary Examiner* — Anh V La
(74) *Attorney, Agent, or Firm* — Womble Bond Dickinson (US) LLP

(57) ABSTRACT

A method for monitoring an operation location of a surface processing apparatus is provided, wherein a surface processing apparatus is allocated to a spatially delimited operation area by way of an allocating unit, and wherein the position of the surface processing apparatus is established, and it is determined whether the surface processing apparatus is disposed inside or outside the operation area. For versatility, the surface processing apparatus is allocated to a first operation area and at least one second operation area that is spatially separated from the first operation area, and it is determinable whether the surface processing apparatus is disposed outside the first operation area but inside the at least one second operation area. Furthermore, the invention relates to a monitoring system for performing the method.

33 Claims, 1 Drawing Sheet

(56) References Cited

U.S. PATENT DOCUMENTS

| | | | |
|---|---|---|---|
| 7,443,298 B2* | 10/2008 | Cole | G06Q 10/08 |
| | | | 119/712 |
| 8,924,042 B2 | 12/2014 | Kim et al. | |
| 2005/0204505 A1 | 9/2005 | Kashiwagi | |
| 2007/0143013 A1 | 6/2007 | Breen | |
| 2011/0202175 A1* | 8/2011 | Romanov | A47L 11/4011 |
| | | | 700/250 |
| 2012/0158915 A1 | 6/2012 | Ham et al. | |
| 2012/0265370 A1* | 10/2012 | Kim | G07C 5/0841 |
| | | | 701/2 |
| 2013/0099977 A1 | 4/2013 | Sheshadri et al. | |
| 2013/0218344 A1* | 8/2013 | Teng | A47L 11/4061 |
| | | | 700/259 |
| 2014/0116469 A1* | 5/2014 | Kim | A47L 9/2894 |
| | | | 134/18 |

\* cited by examiner

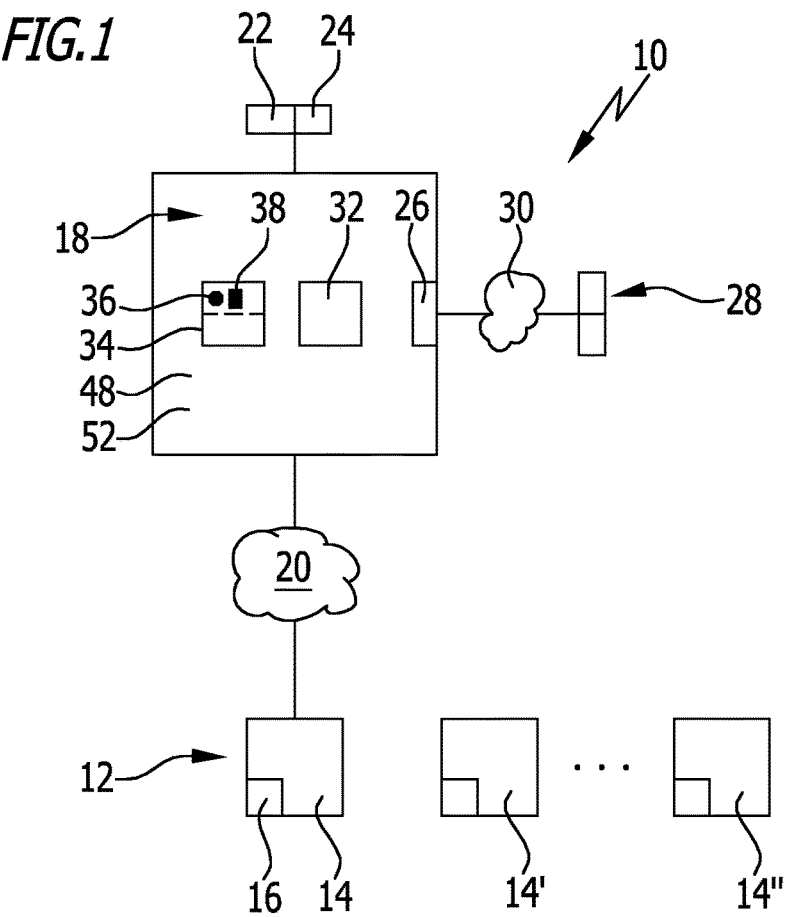
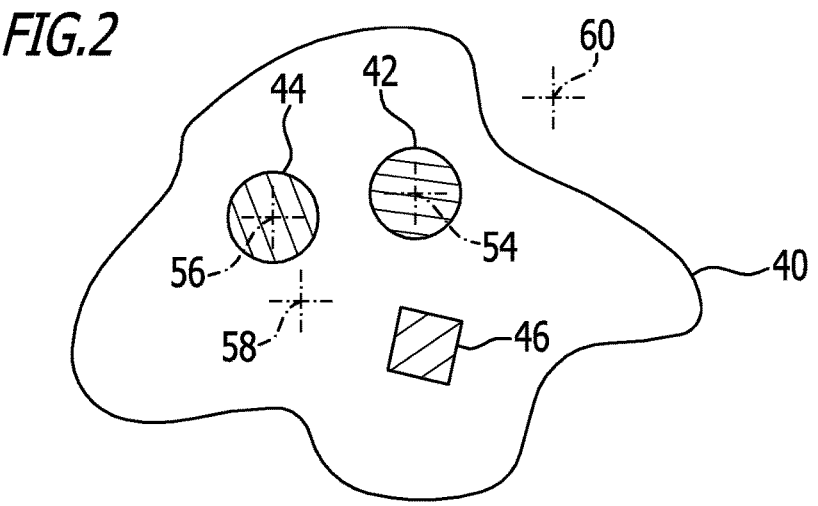

METHOD FOR MONITORING AN OPERATION LOCATION OF A SURFACE PROCESSING APPARATUS, AND MONITORING SYSTEM

CROSS-REFERENCE TO RELATED APPLICATIONS

This application is a continuation patent application of international application number PCT/EP2013/075280, filed on Dec. 2, 2013, which is incorporated herein by reference in its entirety and for all purposes.

FIELD OF THE INVENTION

The present invention relates to a method for monitoring an operation location of a surface processing apparatus, wherein a surface processing apparatus is allocated to a spatially delimited operation area by way of an allocating unit, and wherein the position of the surface processing apparatus is established, and it is determined whether the surface processing apparatus is disposed inside or outside the operation area.

Furthermore, the invention relates to a monitoring system for performing the method.

BACKGROUND OF THE INVENTION

It is known to allocate a work machine, for example in the form of a surface processing apparatus, to an operation area. The operation area, conventionally called a "geofence", may for example be defined by a member of the surveillance personnel or operating personnel of the surface processing apparatus, with the objective of enabling or permitting the surface processing apparatus to be used only inside the operation area. For example, an agreement has been made for use of the surface processing apparatus solely inside the operation area. If the surface processing apparatus is disposed outside the operation area, this can be determined by way of a position sensor, and a corresponding communication can be sent for example to the member of the surveillance personnel or operating personnel.

In the present case, the position of the surface processing apparatus can be determined for example by way of a position sensor that is included or integrated therein, for example a GPS sensor. It is also conceivable to establish the position by way of a radio cell or a mobile radio network, for example a GSM network. The position can also be established for example by the triangulation method, in which mobile radio networks (such as WLANs) that are located in the vicinity of the surface processing apparatus are detected and a conclusion can thus be inferred about the position of the surface processing apparatus.

In the present case, the operation area of the surface processing apparatus is definable in a multiplicity of ways. For example, it is predetermined by a building or a geographical area that can be defined by a system of geographical coordinates. Natural or political borders also allow the operation area to be defined.

US 2013/0099977 A1 describes a method for managing an operation area (geofence). The method proposes modifying the operation area, for example enlarging or reducing it, in dependence on the movement of a mobile device that is allocated to the operation area.

An object underlying the present invention is to provide a method in accordance with the introduction that enables the surface processing apparatus to be used with more versatility.

SUMMARY OF THE INVENTION

In a first aspect of the invention, a method for monitoring an operation location of a surface processing apparatus is provided, wherein a surface processing apparatus is allocated to a spatially delimited operation area by way of an allocating unit, and wherein the position of the surface processing apparatus is established. It is determined whether the surface processing apparatus is disposed inside or outside the operation area. The surface processing apparatus is allocated to a first operation area and at least one second operation area that is spatially separated from the first operation area, and it is determinable whether the surface processing apparatus is disposed outside the first operation area but inside the at least one second operation area.

In a second aspect of the invention, a monitoring system comprises a surface processing apparatus and an allocating unit which is configured to allocate a spatially delimited operation area to the surface processing apparatus, wherein the position of the surface processing apparatus is establishable by means of a position sensor. It is determinable whether the surface processing apparatus is disposed inside or outside the operation area. The surface processing apparatus is configured to be allocated to a first operation area and to at least one second operation area that is spatially separated from the first operation area, and it is determinable whether the surface processing apparatus is disposed outside the first operation area but inside the at least one second operation area.

BRIEF DESCRIPTION OF THE DRAWINGS

The foregoing summary and the following description may be better understood in conjunction with the drawing figures, of which:

FIG. 1 shows a schematic illustration of a monitoring system in accordance with the invention, by means of which a method in accordance with the invention is performable; and FIG. 2 shows a monitoring area comprising three operation areas for surface processing apparatuses, in a schematic illustration.

DETAILED DESCRIPTION OF PREFERRED EMBODIMENTS

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a method for monitoring an operation location of a surface processing apparatus, wherein a surface processing apparatus is allocated to a spatially delimited operation area by way of an allocating unit, and wherein the position of the surface processing apparatus is established, and it is determined whether the surface processing apparatus is disposed inside or outside the operation area. The surface processing apparatus is allocated to a first operation area and at least one second operation area that is spatially separated from the first operation area, and that it is determinable whether the surface processing apparatus is disposed outside the first operation area but inside the at least one second operation area.

As a result of the above-mentioned method, it is possible to use the surface processing apparatus with more versatility. The surface processing apparatus can be used in the first operation area and furthermore in the at least one second operation area. This makes it possible for example, if a surface processing apparatus is missing from, or damaged in, the at least one second operation area, to transport the surface processing apparatus there from the first operation area and to operate it there. The at least one second operation area is for this reason in particular an area in which the use of the surface processing apparatus is permitted just as it is in the first operation area. The method enables comparatively simple management of operation areas if the surface processing apparatus is operated repeatedly in the first operation area and in the at least one second operation area. Unlike the method described in US 2013/0099977 A1, it is in particular not necessary to change the operation areas as a function of time. This allows the complexity of managing operation areas, in particular if there is a multiplicity of surface processing apparatuses and possibly a plurality of operation areas, to be considerably simplified. The number of possible alarm messages indicating that the surface processing apparatus has left the first operation area can also be reduced, in particular if the surface processing apparatus is located in the at least one second operation area before an alarm message of this kind is sent.

In the present case, the operation areas are regarded as spatially separated from one another if they do not overlap geographically or border on one another geographically.

Preferably, the surface processing apparatus is further allocated to a monitoring area that comprises the first operation area and the at least one second operation area, and it is favorable if it is determinable whether the surface processing apparatus is disposed outside the first operation area and the at least one second operation area but inside the monitoring area, or whether the surface processing apparatus is disposed outside the monitoring area. The provision of a monitoring area proves advantageous for example if a user or operating entity of the surface processing apparatus defines different operation areas to which the respectively different surface processing apparatuses are allocated. Thus, it may be provided for an operation area manager to be associated with each operation area and an overall area manager to be associated with all the operation areas. Depending on where the surface processing apparatus is located or where it is moved to, a communication thereof may for example be sent only to the respective operation area manager, to the overall area manager as well, or only to the latter. For example, it may be provided for the overall area manager only to be informed of the whereabouts of the surface processing apparatus if the latter is disposed outside the monitoring area, whereas no communication is made to the overall area manager in the event of movements inside the monitoring area. A communication may be made to the operation area manager for example if the surface processing apparatus is disposed outside the operation area that is associated with that manager (for example the first operation area).

It proves advantageous if the allocating unit has an input interface that preferably provides, comprises or takes the form of an internet portal. By way of the input interface, the surface processing apparatus can be allocated to an operation area or a monitoring area in a user-friendly manner.

It may also be provided for the allocating unit to comprise an input unit or to be coupled to such a unit.

It is advantageous if, by way of the input interface, the allocating unit may be accessed using an external, portable device having an allocation application program stored thereon, for the allocation of an operation or monitoring area to the surface processing apparatus. The portable device, for example a tablet computer or a smartphone having an allocation application program, in particular in the form of a so-called "app", enables user-friendly allocation of an operation or monitoring area. By way of the input interface, the device may be connected to the allocating unit, preferably over the internet. A computer program that can interact with the allocation application program can be executably installed on the allocating unit.

It is favorable if position data of the surface processing apparatus are sent to a report unit and at least one report is sent from the report unit to at least one member of the operating personnel if the surface processing apparatus is not disposed in the first operation area. If the surface processing apparatus is removed from the first operation area, at least one report to this effect may be generated by the report unit and sent to at least one member of the operating personnel.

The report may be sent for example in electronic form, for example as a text message, an email or a fax. In the present case, the term "report" also includes the provision of a corresponding entry for example in a database or memory unit of the report unit. A corresponding entry on the report may be displayed at an output interface of the report unit or called up thereon.

Preferably, the allocating unit is used as the report unit, as a result of which the method can be realized in a structurally simple manner.

The report unit favorably comprises an output interface that preferably provides, comprises or takes the form of an internet portal. By way of the internet portal, for example a web page that is generated by the report unit and is configured to be called up by a member of the operating personnel, the at least one report may be sent to the member of the operating personnel in a user-friendly manner. In the present document, "sending of the report" accordingly also in particular includes the display of a message of the location or the change in location of the surface processing apparatus by way of the internet portal.

It proves advantageous if, by way of the output interface, the report unit is accessed using an external, portable device having a report application program stored thereon, for calling up and/or displaying the at least one report. The external device, for example the smartphone or tablet computer as mentioned above, enables user-friendly access to the report unit. The report application program is in particular in the form of a so-called "app" that can interact with a computer program installed on the report unit.

It is favorable if the at least one report differs, in dependence on where outside the first operation area the surface processing apparatus is disposed, at least in respect of the member of the operating personnel to whom the at least one report is directed, in particular as regards at least one user profile of the member of the operating personnel. This makes it possible to ensure that, depending on the whereabouts of the surface processing apparatus, one or more different members of the operating personnel can be informed in a targeted manner. The members of the operating personnel may differ in particular in respect of their user profile. For example, the user profiles of the above-mentioned operation area manager and overall area manager differ from one another.

It proves advantageous if there is stored a first user profile, to which the at least one report is sent if the surface processing apparatus is disposed outside the first operation area. The first user profile is known to the report unit and stored for example in a memory unit, which may be part of the report unit or coupled thereto. For example, the first user profile is linked to a member of the operating personnel, namely the operation area manager of the first operation area. If the surface processing apparatus is disposed outside the first operation area associated therewith, a report to this effect is made to the operation area manager.

It is advantageous if a different report is generated in dependence on whether the surface processing apparatus is disposed in the at least one second operation area or is in neither the first operation area nor the at least one second operation area. The member of the operating personnel who is associated with the first user profile can thereby determine from the report whether the surface processing apparatus is located in the at least one second operation area and is thus located, as it were, in a "permitted" operation area. If this is not the case, then the surface processing apparatus is disposed in neither the first nor the at least one second operation area and is thus in a "not permitted" operation area, with the result that the member of the operating personnel can be informed on the change in position of the surface processing apparatus and can take any necessary steps.

It is further advantageous if a different report is generated in dependence on whether the surface processing apparatus is disposed inside or outside a monitoring area that comprises the first operation area and the at least one second operation area. The member of the operating personnel who is associated with the first user profile can determine from the report whether the surface processing apparatus is located entirely outside the monitoring area and is accordingly in an "even less permitted" area.

It may be provided for a report to be sent to the first user profile if a further surface processing apparatus that is allocated to a third operation area, which differs spatially from the first operation area and from the at least one second operation area, is disposed in the first operation area. For example, the further surface processing apparatus is primarily allocated to the third operation area and in supplementary manner to the first operation area. If the surface processing apparatus moves into the first operation area, for example in order to perform a processing task there, the position thereof may be detected and a report to that effect generated by the report unit. A member of the operating personnel who is associated with the first user profile is alerted to the fact that a per se "foreign" surface processing apparatus is located in his or her first operation area. This is advantageous for example if, for the purpose of support in a processing task, the corresponding operation area manager of the first operation area has requested a further surface processing apparatus from a further operation area, in this case the third operation area.

It is favorable if there is stored a second user profile, to which the at least one report is sent if the surface processing apparatus is disposed outside a monitoring area that comprises the first operation area and the at least one second operation area. Associated with the second user profile is for example a member of the operating personnel who supervises a plurality of operation areas and the monitoring area. This is for example the above-mentioned overall area manager. For the member of the operating personnel who is associated with the second user profile, the question of in which operation area the surface processing apparatus or further surface processing apparatuses that he or she manages is or are located may be of secondary importance, provided they are disposed inside the monitoring area. However, if a surface processing apparatus is located outside the monitoring area, the member of the operating personnel who is associated with the second user profile is informed thereof.

It may be provided for no report to be sent to the second user profile if the surface processing apparatus is disposed inside the monitoring area. The member of the operating personnel who is associated with the second user profile is informed only if a surface processing apparatus leaves the monitoring area. If no communication to this effect is made, the member of the operating personnel can assume that all the surface processing apparatuses continue to be disposed inside the monitoring area.

It may be provided for the allocation of the surface processing apparatus to an operation area (for example the first or the at least one second operation area) or to a monitoring area to be performed by way of the second user profile. For example, only an authorization level that is linked to the second user profile has the authorization to allocate a surface processing apparatus to a particular area.

It proves advantageous if the method is used with a surface processing apparatus in the form of a surface cleaning device. The method may for example be used by an operating entity or user of surface cleaning devices that has different branches, in each of which different operation areas are defined. The area managed by the branch may be for example the monitoring area, which is divided into a plurality of operation areas.

The surface processing apparatus may be a walk-behind or ride-on device.

The surface cleaning device may be a floor cleaning device, for example a sweeping machine, a vacuum cleaner, a sweeping/vacuum machine or a scrubbing machine.

The surface processing apparatus may also be a blasting device, for example a fluid jet apparatus such as a high-pressure cleaning appliance, or a particle blasting apparatus such as a dry-ice blasting apparatus or a sandblasting apparatus.

The method proves particularly advantageous if the surface processing apparatus is a self-propelling and self-steering surface processing apparatus by means of which a surface can be processed autonomously. Here, it may occur that, as the self-propelling surface processing apparatus moves, it leaves an operation area allocated thereto, or the monitoring area. At least one report to this effect may be generated by the report unit when the position of the surface processing apparatus is established.

As mentioned in the introduction, the present invention also relates to a monitoring system. An object underlying the present invention is to implement a monitoring system for performing one of the above-mentioned methods.

This object is achieved by a monitoring system comprising a surface processing apparatus and an allocating unit which is configured to allocate a spatially delimited operation area to the surface processing apparatus, wherein the position of the surface processing apparatus is establishable by means of a position sensor, and it is determinable whether the surface processing apparatus is disposed inside or outside the operation area. The surface processing apparatus is configured to be allocated to a first operation area and to at least one second operation area that is spatially separated from the first operation area. It is determinable whether the surface processing apparatus is disposed outside the first operation area but inside the at least one second operation area.

The advantages that have already been mentioned in connection with the explanation of the method in accordance with the invention may also be achieved by using the monitoring system. In this regard reference may be made to the explanations above.

Accordingly, in relation to advantages of the advantageous embodiments of the monitoring system that are mentioned below, reference may be made to the explanations above in relation to advantageous exemplary embodiments of the method in accordance with the invention.

Advantageously, the surface processing apparatus comprises the position sensor, for example a GPS sensor. As a position sensor there is also understood in the present case a device explained in the introduction by means of which the position of the surface processing apparatus can be determined from radio cells, for example of a GSM network, or a device by means of which the position can be determined by triangulation from information from radio networks.

It is advantageous if the surface processing apparatus is further configured to be allocated to a monitoring area that comprises the first operation area and the at least one second operation area, and if it is determinable whether the surface processing apparatus is disposed outside the first operation area and the at least one second operation area but inside the monitoring area, or whether the surface processing apparatus is disposed outside the monitoring area.

Favorably, the allocating unit has an input interface that preferably provides, comprises or takes the form of an internet portal.

It is advantageous if the input interface takes a form such that thereon the allocating unit is accessible using an external, portable device having an allocation application program stored thereon, for the allocation of an operation or monitoring area to the surface processing apparatus.

Preferably, the monitoring system comprises a report unit to which position data are sent and from which at least one report is sendable to at least one member of the operating personnel if the surface processing apparatus is not disposed in the first operation area.

Favorably, the allocating unit comprises or forms the report unit or vice versa.

Advantageously, the report unit has an output interface that preferably provides, comprises or takes the form of an internet portal.

It is favorable if the output interface is configured such that the report unit is accessible using an external, portable device having a report application program stored thereon, for calling up and/or displaying the at least one report.

It is favorable if the at least one report differs, in dependence on where outside the first operation area the surface processing apparatus is disposed, at least in respect of the member of the operating personnel to whom the at least one report is directed, in particular as regards at least one user profile of the member of the operating personnel, which is stored in a memory unit of the monitoring system.

Preferably, there is stored in the memory unit a first user profile to which the at least one report is sent if the surface processing apparatus is disposed outside the first operation area.

Favorably, a different report is generated in dependence on whether the surface processing apparatus is disposed in the at least one second operation area or is in neither the first operation area nor the at least one second operation area.

Advantageously, a different report is generated in dependence on whether the surface processing apparatus is disposed inside or outside a monitoring area that comprises the first operation area and the at least one second operation area.

It is favorable if a report is sent to the first user profile if there is disposed in the first operation area a further surface processing apparatus that is allocated to a third operation area, which differs spatially from the first operation area and from the at least one second operation area.

Preferably, there is stored in the memory unit a second user profile, to which the at least one report is sent if the surface processing apparatus is disposed outside a monitoring area that comprises the first operation area and the at least one second operation area.

Favorably, no report is sent to the second user profile if the surface processing apparatus is disposed inside the monitoring area.

Preferably, the allocation of the surface processing apparatus to an operation area or a monitoring area may be performed by way of the second user profile.

The surface processing apparatus may be a surface cleaning device, in particular a floor cleaning device. Examples of surface cleaning devices have already been mentioned above.

The surface processing apparatus may be a self-propelling and self-steering surface processing apparatus.

FIG. 1 shows schematically a monitoring system that bears the reference numeral 10 and comprises a surface processing apparatus 12 for processing a surface that is not illustrated in the drawing. The surface processing apparatus 12 in the present case takes the form of a floor cleaning appliance 14, for example a sweeping machine, a vacuum cleaner, a sweeping/vacuum machine or a scrubbing machine.

The monitoring system 10 preferably has further surface processing apparatuses, of which two further floor cleaning appliances 14' and 14" are shown by way of example.

The floor cleaning appliance 14 comprises a position sensor 16 by means of which the position of the floor cleaning appliance 14 is establishable. For example, the position sensor 16 is a GPS sensor. It is also conceivable to determine, by way of the identifiers of radio cells of a mobile radio network, where the floor cleaning appliance 14 is located. Also regarded as a position sensor is a device of the floor cleaning appliance 14 that, for example by way of a mobile radio network, sends an identifier that is evaluated to determine the location of the floor cleaning appliance 14, for example by the data processing device that is mentioned below.

The monitoring system 10 comprises a data processing device 18, for example a computer or server in the possession of or managed by an operating entity or user of the monitoring system 10. The data processing device 18 is coupled or couplable to the floor cleaning appliance 14 by way of a communication network 20. The communication network 20 is for example a telecommunications network or the internet.

Further, the monitoring system 10 comprises an input unit 22 and an output unit 24, which are coupled to the data processing device 18. The data processing device 18 further comprises an input and/or output interface 26. By way of the interface 26, an external and preferably portable device 28 may be coupled to the data processing device 18. For example, the device 28 is a smartphone or tablet computer, and it may be coupled to the interface 26 for example by way of a communication network 30, such as the internet.

There may be executably stored on the device 28 an application program in the form of a so-called "app", by way of which the interface 26 may be accessed. For example, the interface 26 provides or forms an internet portal. As an alternative or in addition, the member of the operating personnel may access software that is executably stored in the data processing device 18. For executing the software, the data processing device 18 comprises a processing element 32, for example a microprocessor.

The device 28 may also be a conventional computer by way of which the above-mentioned internet platform may be called up without the need to store an application program on the device 28 for this purpose.

The data processing device 18 further comprises a memory unit 34. The memory unit 34 contains an item of information on operation areas and monitoring areas for the floor cleaning appliance 14 and further surface processing apparatuses 12 that are included in the monitoring system 10. These areas are discussed in more detail below.

Further stored in the memory unit 34 are user profiles for members of the operating personnel of the monitoring system 10. By way of example, a first user profile 36 and a second user profile 38 are illustrated. The user profiles 36, 38 are associated with different members of the operating personnel and differ, for example in relation to the authorization level for use of the monitoring system 10. In particular, the user profiles 36, 38 also differ in relation to how the respective member of the operating personnel is informed if there is a change in the location of the floor cleaning appliance 14.

The member of the operating personnel who is associated with the user profile 38 is for example an overall area manager of an operating entity or user of the monitoring system 10, who supervises all the surface processing apparatuses 12 that are associated with a monitoring area 40. The monitoring area 40 may for example be defined by political borders or by borders that are defined by a system of geographical coordinates. The same applies to areas inside the monitoring area 40.

Inside the monitoring area 40, a plurality of operation areas for surface processing apparatuses 12 may be defined, for example a first operation area 42, a second operation area 44 and a third operation area 46.

The member of the operating personnel who is associated with the user profile 36 is for example an operation area manager, who supervises all the surface processing apparatuses 12 that are allocated to his or her operation area. For example, the operation area manager supervises the first operation area 42.

Surface processing apparatuses 12 of the monitoring system 10 may in the present case be allocated to one or more operation areas 42, 44, 46, which are in particular spatially separated from one another, and to the monitoring area 40. Allocation is carried out, using the data processing device 18, for example by the member of the operating personnel who is associated with the user profile 38, in particular an overall area manager. However, it is also possible for allocation to be performed by a different kind of member of the operating personnel, who for this purpose may have a corresponding user profile that may be stored in the memory unit 34 with the corresponding authorizations.

Because of the possibility of allocating surface processing apparatuses 12 to areas, the data processing device 18 is also called an allocating unit 48. Allocation is performed for example using the external device 28 or the input unit 22.

It is assumed below that the floor cleaning appliance 14 is allocated to the first operation area 42. The first operation area 42 corresponds to the primary operation area of the floor cleaning appliance 14, in which the latter usually performs cleaning tasks. The particular feature of the monitoring system 10 and the method that is performable therewith consists, in the present case, in the fact that each surface processing apparatus 12 may be allocated to more than just one operation area. In the present case, the floor cleaning appliance 14 is also allocated to the second operation area 44, which is spatially separated from the first operation area 42. Furthermore, the floor cleaning appliance 14 is allocated to the monitoring area 40 that comprises the operation areas 42, 44, 46.

The position of the floor cleaning appliance 14 is determined, for example at regular intervals, using the position sensor 16, and position data that relate thereto are transferred to the data processing device 18. Depending on the position of the floor cleaning appliance 14, the data processing device 18 generates a report on the position and/or changes in position of the floor cleaning appliance 14. For this reason, the data processing device 18 is also called a report unit 52. Depending on the position and/or the change in position, the generated and sent report from the report unit 52 differs at least in respect of the member of the operating personnel to whom the report is directed. For example, depending on the position and/or the change in position the report is sent to only one or both members of the operating personnel who are associated with the user profiles 36, 38.

In the present case, the report is preferably sent by way of the internet portal that is provided by the data processing device 18. The report may be displayed at the external device 28 or the output unit 24. The report may further be stored in the memory unit 34. The report may also include a message in text form or in the form of an email to a member of the operating personnel of the monitoring system 10.

If the floor cleaning appliance 14 is disposed in the first operation area 42 (the primary operation area), for example at the position 54, it is disposed inside the operation area 42 that is "permitted" to it. It may be provided for no special report to this effect to be generated by the data processing device 18.

It may be provided, for the purpose of performing a cleaning task, for the floor cleaning appliance 14 to be transported into the operation area 44 to which it has likewise been allocated, and which accordingly is likewise a permitted operation area for the floor cleaning appliance 14. Once the floor cleaning appliance 14 is disposed in the operation area 44, for example at the position 56, this can be determined by way of the position data of the position sensor 16, and a signal to this effect can be provided to the data processing device 18. The data processing device 18 generates a report. In the present case, the report is only directed to the member of the operating personnel who is associated with the first user profile 36, the operation area manager for the operation area 42. The latter is informed that the floor cleaning appliance 14 is located outside its primary operation area 42 but still inside a further permitted operation area 44.

By contrast, in the present case no report to this effect is made to the member of the operating personnel who is associated with the user profile 38, the overall area manager for the monitoring area 40.

If the floor cleaning appliance 14 is disposed outside the operation areas 42, 44 to which it is allocated but inside the monitoring area 40, at an exemplary position 58, the data processing device 18 generates a report to this effect. In this case, the report is likewise sent only to the operation area manager who is associated with the user profile 36 and not to the overall area manager who is associated with the user profile 38. In particular, in this case the report includes an alarm message for the operation area manager, indicating that the floor cleaning appliance 14 is located outside the permitted operation areas 42, 44. Where necessary, the operation area manager can take steps to determine the cause of the floor cleaning appliance 14 being located outside permitted operation areas 42, 44.

If the floor cleaning appliance 14 is disposed outside the monitoring area 40, for example at the position 60, the data processing device 18 generates a report to this effect. In this case the report may be directed to the operation area manager who is associated with the user profile 36 and in particular include an alarm message indicating that the floor cleaning appliance 14 is located not merely outside permitted operation areas 42, 44 but even outside the monitoring area 40.

In this case, the report is also sent to the overall area manager who is associated with the user profile 38, so that he or she is informed of the same facts. In particular, the overall area manager is preferably only informed of positions and/or changes in position of the floor cleaning appliance 14 if the latter is located outside the monitoring area 40 he or she supervises, but not in the event of movements inside the monitoring area 40.

The monitoring system 10 makes it possible in particular to establish the user profile to which a report is sent in the event of a change in position of the floor cleaning appliance 14, and this may also differ from the example that is explained above. However, the reports may differ, specifically in dependence on the position and/or change in position of the floor cleaning appliance 14, at least as regards the user profile to which they are directed.

Depending on the user profile and consequently the function of sending different reports to the member of the operating personnel who is associated with a respective user profile, it is consequently possible for the respective member of the operating personnel to have a different view of positions and/or changes in position of the surface processing apparatuses 12. While changes in position may be significant in the case of an operation area manager, because the floor cleaning appliance 14 is located outside permitted operation areas 42, 44, this may not be of interest to an overall area manager, provided the floor cleaning appliance 14 is located inside the monitoring area 40.

As a result of the possibility of allocating a floor cleaning appliance 14 to more than just one operation area 42, 44, it is possible to reduce the number of per se superfluous alarm messages when the floor cleaning appliance 14 is moved outside the operation area 42 but inside the operation area 44, even if it is temporarily moved through a "not permitted" area inside or even outside the monitoring area 40.

It is assumed below that a further floor cleaning appliance, for example the floor cleaning appliance 14', is allocated to the operation area 46 as the primary operation area and additionally to the operation area 42 as a further operation area. When the floor cleaning appliance 14' is disposed in the operation area 42, it may be provided for a report to this effect to be sent by the data processing device 18 to the operation area manager who is associated with the user profile 36. He or she may be informed that the floor cleaning appliance 14' is located inside the permitted operation area 42 that is allocated to him or her, as a "foreign" floor cleaning appliance.

It may be provided for example for the operation areas 42, 44, 46 to be divided into operation regions that are spatially separated from one another. An operation region is for example a building inside an operation area. It is accordingly possible, in the event of changes in position inside the operation area 42 too, for the data processing device 18 to generate and send reports to different user profiles in dependence on the position. For example, there may be stored in the memory unit 34 a further user profile whereof the associated member of the operating personnel (a section manager) supervises a surface cleaning device only of one operation region inside the operation area. If the surface cleaning device 12 leaves the operation region (for example the building), the section manager is informed thereof but the operation area manager who is associated with the user profile 36 is not, provided the surface processing apparatus is not disposed outside the operation area allocated to him or her.

The invention claimed is:

1. A method for monitoring an operation location of a surface processing apparatus, wherein the surface processing apparatus is allocated to a spatially delimited operation area by way of an allocating unit, the position of the surface processing apparatus is established and it is determined whether the surface processing apparatus is disposed inside or outside the operation area, the method comprising:
   allocating the surface processing apparatus to a first operation area and at least one second operation area that is spatially separated from the first operation area;
   determining whether the surface processing apparatus is disposed outside the first operation area but inside the at least one second operation area;
   sending position data of the surface processing apparatus to a report unit and sending at least one report from the report unit to at least one member of the operating personnel if the surface processing apparatus is not disposed in the first operation area;
   wherein the at least one report differs, in dependence on where outside the first operation area the surface processing apparatus is disposed, at least in respect of the at least one member of the operating personnel to whom the at least one report is directed.

2. The method in accordance with claim 1, wherein the surface processing apparatus is further allocated to a monitoring area that comprises the first operation area and the at least one second operation area, and wherein it is determinable whether the surface processing apparatus is disposed outside the first operation area and the at least one second operation area but inside the monitoring area, or whether the surface processing apparatus is disposed outside the monitoring area.

3. The method in accordance with claim 1, wherein the allocating unit has an input interface that preferably provides, comprises or takes the form of an internet portal.

4. The method in accordance with claim 3, wherein, by way of the input interface, the allocating unit is accessible using an external, portable device having an allocation application program stored thereon, for the allocation of an operation or monitoring area to the surface processing apparatus.

5. The method in accordance with claim 1, wherein the allocating unit is used as the report unit.

6. The method in accordance with claim 1, wherein the report unit has an output interface that preferably provides, comprises or takes the form of an internet portal.

7. The method in accordance with claim 6, wherein, by way of the output interface, the report unit is accessed using an external, portable device having a report application program stored thereon, for at least one of calling up and displaying the at least one report.

8. The method in accordance with claim 1, wherein there is stored a first user profile, to which the at least one report is sent if the surface processing apparatus is disposed outside the first operation area.

9. The method in accordance with claim 8, wherein a different report is generated in dependence on whether the surface processing apparatus is disposed in the at least one second operation area or in neither the first operation area nor the at least one second operation area.

10. The method in accordance with claim 8, wherein a different report is generated in dependence on whether the surface processing apparatus is disposed inside or outside a monitoring area that comprises the first operation area and the at least one second operation area.

11. The method in accordance with claim 8, wherein a report is sent to the first user profile if a further surface processing apparatus that is allocated to a third operation area, which differs spatially from the first operation area and from the at least one second operation area, is disposed in the first operation area.

12. The method in accordance with claim 8, wherein there is stored a second user profile, to which the at least one report is sent if the surface processing apparatus is disposed outside a monitoring area that comprises the first operation area and the at least one second operation area.

13. The method in accordance with claim 12, wherein no report is sent to the second user profile if the surface processing apparatus is disposed inside the monitoring area.

14. The method in accordance with claim 12, wherein the allocation of the surface processing apparatus to an operation area or to a monitoring area is performed by way of the second user profile.

15. The method in accordance with claim 1, wherein the method is used with a surface processing apparatus in the form of a surface cleaning device.

16. The method in accordance with claim 1, wherein as the surface processing apparatus there is used a self-propelling and self-steering surface processing apparatus.

17. A monitoring system comprising a surface processing apparatus and an allocating unit which is configured to allocate a spatially delimited operation area to the surface processing apparatus, the position of the surface processing apparatus being establishable by means of a position sensor, and it being determinable whether the surface processing apparatus is disposed inside or outside the operation area;
wherein the surface processing apparatus is configured to be allocated to a first operation area and to at least one second operation area that is spatially separated from the first operation area;
wherein it is determinable whether the surface processing apparatus is disposed outside the first operation area but inside the at least one second operation area;
wherein the monitoring system comprises a report unit to which position data are sent and from which at least one report is sendable to at least one member of the operating personnel if the surface processing apparatus is not disposed in the first operation area;
and wherein the at least one report differs, in dependence on where outside the first operation area the surface processing apparatus is disposed, at least in respect of the at least one member of the operating personnel to whom the at least one report is directed.

18. The monitoring system in accordance with claim 17, wherein the surface processing apparatus comprises the position sensor.

19. The monitoring system in accordance with claim 17, wherein the surface processing apparatus is further configured to be allocated to a monitoring area that comprises the first operation area and the at least one second operation area, and wherein it is determinable whether the surface processing apparatus is disposed outside the first operation area and the at least one second operation area but inside the monitoring area, or whether the surface processing apparatus is disposed outside the monitoring area.

20. The monitoring system in accordance with claim 17, wherein the allocating unit has an input interface that preferably provides, comprises or takes the form of an internet portal.

21. The monitoring system in accordance with claim 20, wherein the input interface takes a form such that thereon the allocating unit is accessible using an external, portable device having an allocation application program stored thereon, for the allocation of an operation or monitoring area to the surface processing apparatus.

22. The monitoring system in accordance with claim 17, wherein the allocating unit comprises or forms the report unit or wherein the report unit comprises or forms the allocating unit.

23. The monitoring system in accordance with claim 17, wherein the report unit has an output interface that preferably provides, comprises or takes the form of an internet portal.

24. The monitoring system in accordance with claim 23, wherein the output interface is configured such that the report unit is accessible using an external, portable device having a report application program stored thereon, for at least one of calling up and displaying the at least one report.

25. The monitoring system in accordance with claim 17, wherein there is stored in the memory unit a first user profile to which the at least one report is sent if the surface processing apparatus is disposed outside the first operation area.

26. The monitoring system in accordance with claim 25, wherein a different report is generated in dependence on whether the surface processing apparatus is disposed in the at least one second operation area or is in neither the first operation area nor the at least one second operation area.

27. The monitoring system in accordance with claim 25, wherein a different report is generated in dependence on whether the surface processing apparatus is disposed inside or outside a monitoring area that comprises the first operation area and the at least one second operation area.

28. The monitoring system in accordance with claim 25, wherein a report is sent to the first user profile if there is disposed in the first operation area a further surface processing apparatus that is allocated to a third operation area, which differs spatially from the first operation area and from the at least one second operation area.

29. The monitoring system in accordance with claim 25, wherein there is stored in the memory unit a second user profile, to which the at least one report is sent if the surface processing apparatus is disposed outside a monitoring area that comprises the first operation area and the at least one second operation area.

30. The monitoring system in accordance with claim 29, wherein no report is sent to the second user profile if the surface processing apparatus is disposed inside the monitoring area.

31. The monitoring system in accordance with claim 29, wherein the allocation of the surface processing apparatus to an operation area or a monitoring area is performable by way of the second user profile.

32. The monitoring system in accordance with claim 17, wherein the surface processing apparatus is a surface cleaning device.

33. The monitoring system in accordance with claim 17, wherein the surface processing apparatus is a self-propelling and self-steering surface processing apparatus.

* * * * *